United States Patent [19]
Matthes

[11] 3,868,561
[45] Feb. 25, 1975

[54] RESONANT CIRCUIT TRANSFORMER

[75] Inventor: Hans Matthes, Remscheid, Germany

[73] Assignee: AEG—Elotherm G.m.b.H. Remscheid, West Germany

[22] Filed: Mar. 12, 1974

[21] Appl. No.: 450,377

[30] Foreign Application Priority Data
Mar. 30, 1973  Germany............................ 2315970

[52] U.S. Cl.................... 321/10, 336/178, 336/212, 333/79
[51] Int. Cl. ........................................... H02m 1/14
[58] Field of Search .......... 321/2, 45 R, 10; 333/79, 333/178; 336/211, 219, 233, 234, DIG. 3

[56] References Cited
UNITED STATES PATENTS
| | | | |
|---|---|---|---|
| 3,340,458 | 9/1967 | Keller .................................... | 321/10 |
| 3,519,915 | 7/1970 | Kelley, Jr............................. | 321/45 R |
| 3,603,864 | 9/1971 | Thaler................................. | 336/178 |
| 3,748,618 | 7/1973 | Kaiserwerth et al............ | 336/233 X |

Primary Examiner—R. N. Envall, Jr.
Attorney, Agent, or Firm—Cushman, Darby and Cushman

[57] ABSTRACT

A parallel resonant circuit transformer of the type having a controllable rectifier element fed by an AC current supply, an inverter output circuit incorporating an inductor and a smoothing choke connecting said rectifier to said inverter circuit and including a magnetic core element having a plurality of legs, each leg including a laminated magnetic core section in each leg and at least one section of ferromagnetic core material in each leg having a saturation induction lower than the saturation induction of said laminated core section to prevent interruptions of DC current.

2 Claims, 5 Drawing Figures

RESONANT CIRCUIT TRANSFORMER

The invention relates to a parallel resonant circuit transformer of the type having an inverter which is fed from an AC current supply via a controllable rectifier and a smoothing choke in a DC current intermediate circuit.

Such transformers, as is known for example from the German published application No. 1,615,126 has been used successfully as medium frequency generators operating preferably in the area of 200 to 10,000 Hz for feeding inductors which inductively heat or melt metallic workpieces or raw materials. When several resonant circuit transformers are used in parallel, the load of the inverter, and more particularly the inductor varies during the heating or melting operation, in most cases within wide limits. In order to be able to use an operational range permitted by the permissible characteristics of the controllable semiconductor elements of the inverter, in most instances the inverter current must be controlled within a wide range.

Figure 1:
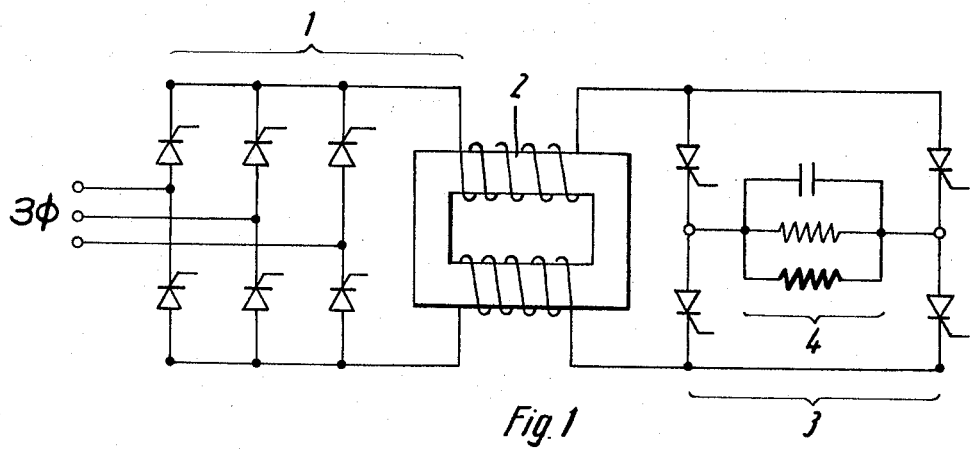

The basic circuit of such a parallel resonant circuit transformer consisting of rectifier 1, smoothing choke 2 and inverter 3 is shown in FIG. 1.

From a 3-phase system, a DC current intermediate circuit is fed by way of a 3-phase rectifier bridge circuit 1 which is conventionally controlled in accordance with detected phase angle, which bridge circuit 1 contains in each phase one of the two windings of a smoothing choke 2. Connected to choke 2 is inverter bridge circuit 3, which is conventionally controlled as a function of inverter frequency, from which circuit the parallel resonant circuit 4 containing the inductor is fed. In the operation of the transformer for medium and high DC current values quite a considerable ripple component can be tolerated so that a relatively low choke-inductivity is acceptable.

However, it has been found that in case of a smoothing choke in the intermediate circuit of the transformer, the inductance of which in the case of medium or high DC current values suffices for a satisfactory inverter operation, an interruption of the DC current can occur in the case of low DC current values, particularly when a large phase angle is produced, which interruption must be avoided under all circumstances in the case of parallel resonant circuit transformers. Iron chokes with an air gap, which have a correspondingly sheared magnetization characteristic curve and which would satisfy both the requirements for low as well as for medium or high DC current values for the intermediate circuit, are very large and expensive.

According to this invention in parallel resonant circuit changer with an inverter fed from an AC current supply by way of a controllable rectifier, as well as with a smoothing choke in a DC current intermediate circuit, interruption of the DC current in the intermediate circuit is avoided at low DC current values with the help of a smoothing choke, which is relatively small in size and inexpensive and in which a greater ripple component is permitted at medium and high DC current values.

The problem is solved according to the parallel resonant circuit changer according to the invention through the fact that the magnetic circuit of the smoothing choke contains a ferromagnetic core section with a saturation induction lower than that of a laminated sheet metal core also in the magnetic circuit.

In an advantageous embodiment of the invention, the magnetic circuit of the smoothing choke contains, beside the laminated core, several sections which are different, one from the other, in saturation induction, which in each case are lower than those of the laminated core.

The invention will be explained in more detail subsequently on the basis of the FIGS. 2–5. A preferred embodiment of the smoothing choke, as used in the parallel resonant circuit changer according to the invention, is shown in a schematic presentation in FIG. 2, and in vertical projection as in FIG. 3, corresponding to line I—I in FIG. 2, in section.

The frame-shaped magnetic core is held together at its under and upper side by two U-shaped carriers 5, which are connected together by tie-bars 6 at both sides of the core. The two perpendicular legs of the magnetic core are enclosed by a one-layer choke winding 7 built-up of hollow copper profile. Choke windings 7 at the same time are supported directly on their connecting plates 8, which are mounted electrically insulated on one of the under or upper U-carriers 5.

The magnetic core, which is built-up of transformer laminated cores 9 over the largest part of its magnetic circuit, includes in each of its peripheral legs a section 10 of nonmagnetic electrically insulating material, which is constituted preferably by craft paper, as well as a section 11, which is built-up of small blocks of sintered ferromagnetic core material with a lower saturation induction than that of the transformer laminated core. Electric insulation of the core sections from each other is effected through intermediate layers 12 of craft paper.

Figure 2:
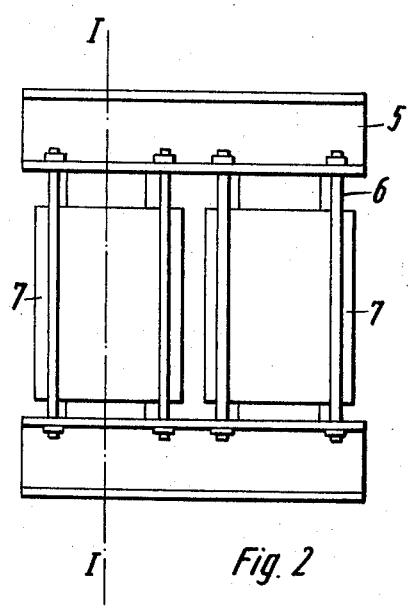
Figure 3:
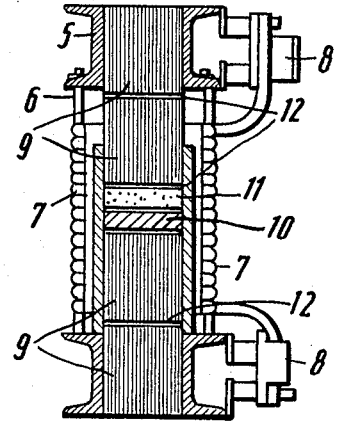
Figure 4:
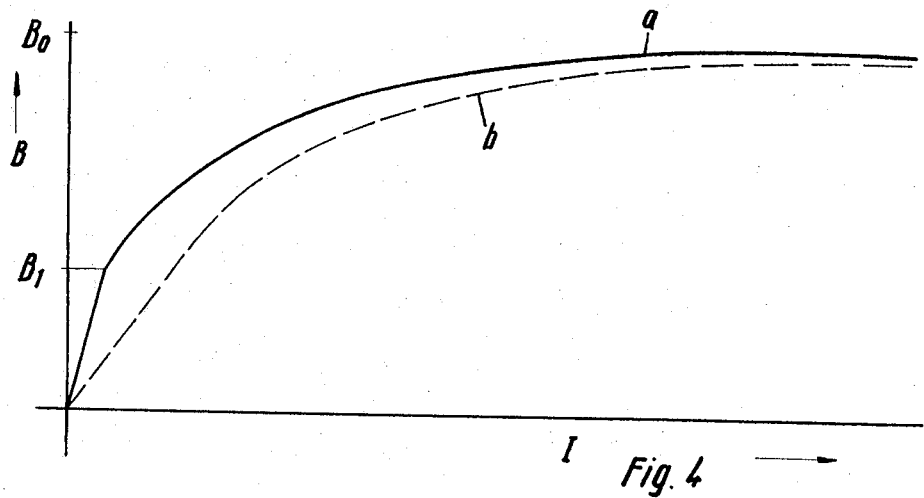

Curve $a$ in FIG. 4 shows the induction characteristic of a smoothing choke as a function of current I, as described in FIGS. 2 and 3, and curve $b$ shows, for the purpose of comparison, the same characteristic of a conventional air gap-choke of approximately the same dimensions. Under $B_o$ the saturation induction for the transformer laminated core predominates and under $B_t$ the saturation induction for the sintered core material. Induction valve $B_t$ corresponds to a bend in the characteristic curve $a$. As can be seen in characteristic curves $a$ and $b$, for higher current intensities I, a better smoothing of the DC current can be achieved than can be achieved in the case of a conventional "air gap choke" of about the same dimension. The steepness and shape of the characteristic curve in the area of low current intensities and in the case of the smoothing choke used in the parallel resonant circuit changer according to the invention, can be varied within wide limits through selection of the length of the section of low saturation induction in relation to the dimension of the "air gap," i.e., for the measurement of the section of the magnetic circuit, which consists of nonmagnetic insulating material, and thus it can be adapted in each case to the special requirements of the inverter circuit.

Figure 5:
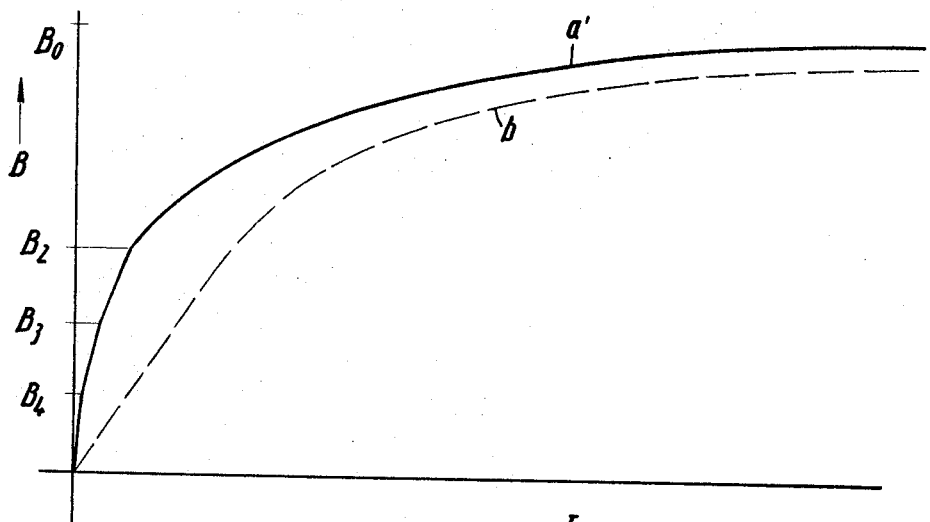

An even more precise adaptation of the choke induction characteristic curve to an optimum desired form can be achieved by providing several sections made of ferromagnetic core material of variable saturation induction in the core of the smoothing choke next to the areas formed by the transformer laminated cores. Curve $a'$ in FIG. 5 represents the induction characteristic curve of a choke with three such sections corresponding to three variable saturation inductions $B_2$, $B_3$ and $B_4$, as compared to the characteristic curve $b$ of a standard air gap choke of about the same dimension.

Many changes and modifications in the above described embodiment of the invention can of course be carried out without departing from the scope thereof. Accordingly, that scope is intended to be limited only by the scope of the appended claims.

What is claimed is:

1. In a parallel resonant circuit transformer of the type having a controllable rectifier element fed by an AC current supply, an inverter output circuit incorporating an inductor and a smoothing choke connecting said rectifier to said inverter circuit and including a magnetic core element having a plurality of legs, the improvement comprising a laminated magnetic core section in each leg and at least one section of ferromagnetic core material in each leg having a saturation induction lower than the saturation induction of said laminated core section.

2. In a transformer as in claim 1 the further improvement comprising a plurality of said sections having a lower saturation induction, each said section of said plurality of sections having a saturation induction which differs from that of the other sections.

* * * * *